(No Model.) 2 Sheets—Sheet 2.
N. J. PRITCHARD.
HOSE COUPLING.
No. 415,062. Patented Nov. 12, 1889.
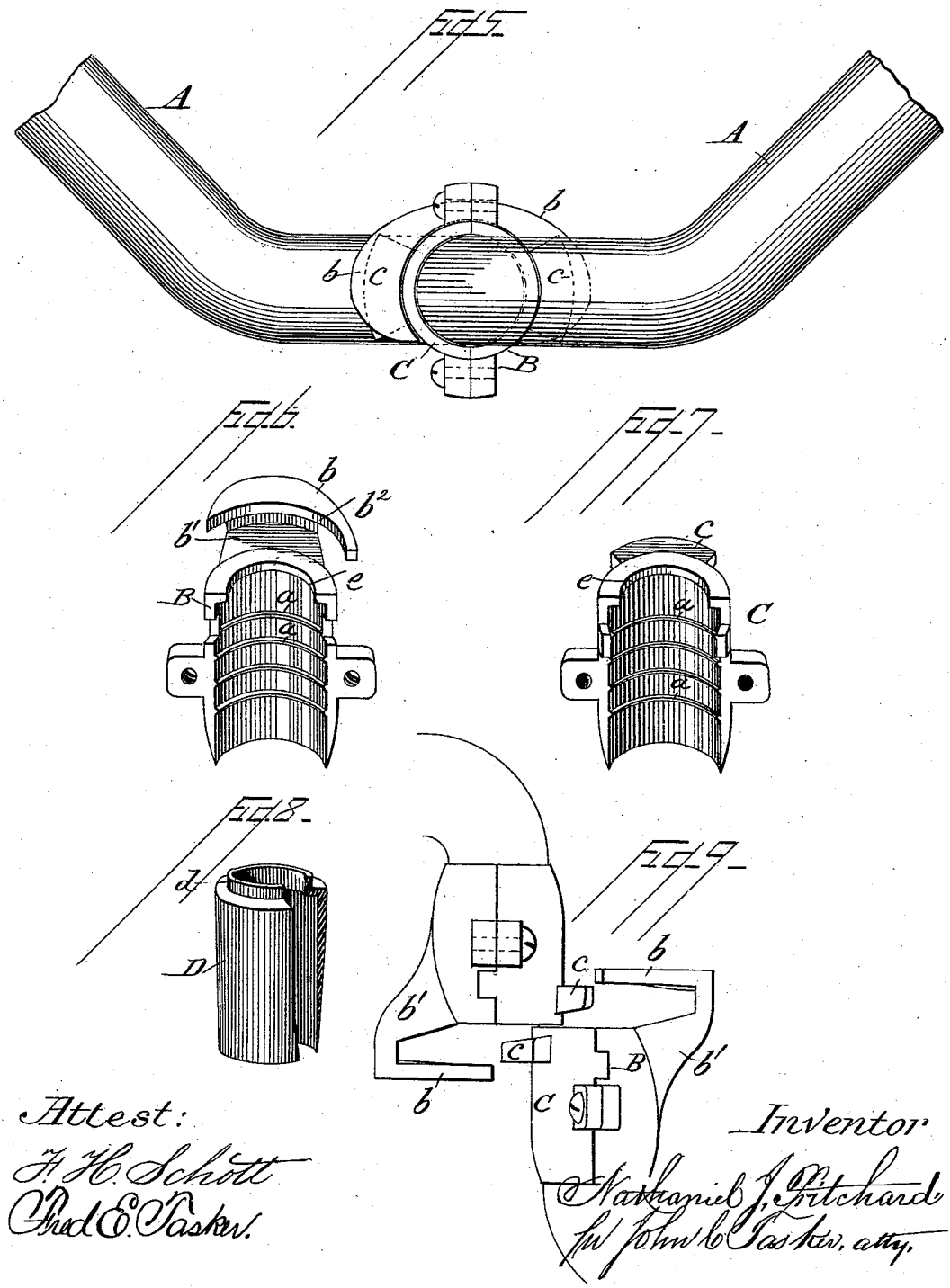
Attest:
F. H. Schott
Fred E. Tasker
Inventor
Nathaniel J. Pritchard
by John C. Tasker, atty.

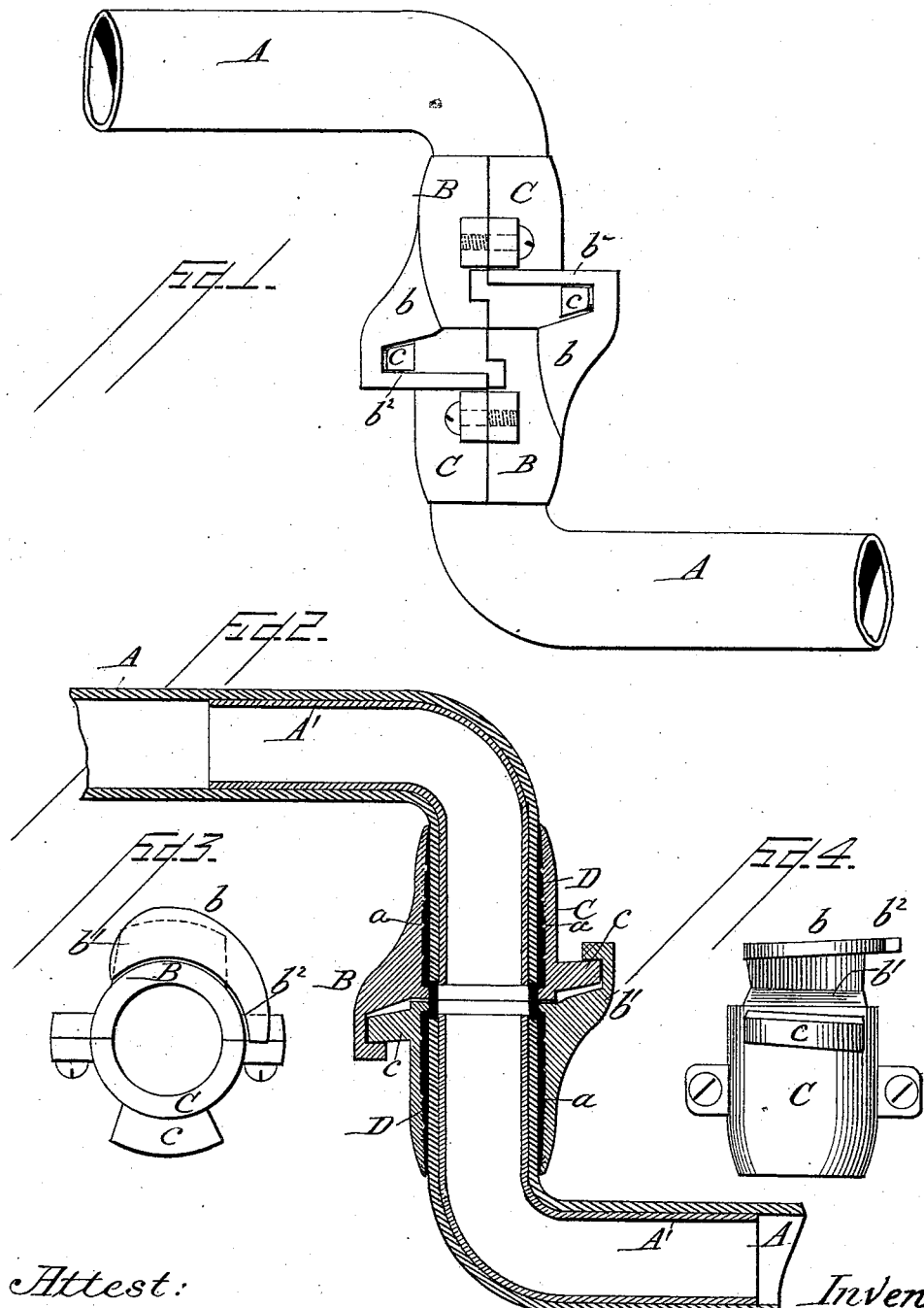

UNITED STATES PATENT OFFICE.

NATHANIEL J. PRITCHARD, OF ROANOKE, VIRGINIA, ASSIGNOR TO THE PRITCHARD BRAKE COMPANY, OF SAME PLACE.

HOSE-COUPLING.

SPECIFICATION forming part of Letters Patent No. 415,062, dated November 12, 1889.

Application filed March 28, 1889. Serial No. 305,101. (No model.)

*To all whom it may concern:*

Be it known that I, NATHANIEL J. PRITCHARD, a citizen of the United States, residing at Roanoke, in the county of Roanoke and State of Virginia, have invented certain new and useful Improvements in Hose-Couplings; and I do hereby declare the following to be a full, clear, and exact description of the invention, such as will enable others skilled in the art to which it appertains to make and use the same.

My present invention refers to an improvement in hose couplings or connections, the particular and preferred use of the same being that of coupling together the different sections of air-pipes employed with pneumatic brakes.

The object of the invention is to simplify and perfect the construction of hose-couplings of this kind, so that said couplings may be readily connected and disconnected both by hand and by the abnormal movement of the train at the time of accidents.

The invention consists, essentially, in the construction, arrangement, and combination of parts, substantially as will be hereinafter described and claimed.

In the accompanying drawings, illustrating my invention, Figure 1 is a plan view showing two sections of pipe and my improved coupling for connecting the same, the parts of the coupling being shown in engagement with each other. Fig. 2 is a longitudinal section of the same. Fig. 3 is an end view of the coupling. Fig. 4 is a vertical front elevation of the same. Fig. 5 is a plan view, similar to Fig. 1, of two sections of pipe connected by my improved hose-coupling, the plan view of the coupling, however, in this figure being at right angles to that in Fig. 1. Fig. 6 is a perspective view of one of the semi-cylindrical sections of the coupling. Fig. 7 is a perspective view of the other semi-cylindrical section. Fig. 8 is a perspective view of the interior bushing, of gum or other elastic material, which is placed within the coupling. Fig. 9 is a partial diagrammatic plan view of the hose-coupling, showing the parts of the same disengaged and in the position where they may be readily brought into engagement.

Like letters of reference designate corresponding parts throughout all the different figures.

A A denote two sections of pipe. They are shown here by way of example only for the purpose of illustrating the location and use of my improved coupling. In Figs. 1 and 2 these sections of pipe are shown as being bent at a right angle near the point where they are coupled together. This is a usual feature in the construction of air-pipes of pneumatic-brake systems.

My improved hose-coupling consists of two parts, which are exact duplicates of each other, one of said parts being secured to and carried on the end of one section A of the air-pipe, while the other part is secured to and carried on the end of the other section A of the air-pipe. Although these parts of the coupling are duplicates, yet they are differently positioned with relation to the pipe-sections to which they are connected, so that parts of the said duplicate couplings may be brought into juxtaposition with each other for the purpose of engaging them, and thus fastening the sections or lines of air or other pipe securely together.

As these duplicate parts of the coupling are similarly constructed in all respects, I will proceed to describe one of them and then to show the mode of connecting and using them. Each part of the coupling consists of two semi-cylindrical sections. One of these sections is lettered B and is represented fully in Fig. 1. The other section is lettered C and is adequately illustrated in Fig. 7. These two semi-cylindrical sections are provided with ears or lugs whereby they are bolted or otherwise fastened firmly together, as shown in Figs. 1, 4, and 9. When the two semi-cylindrical sections are firmly connected, they will form a substantial cylinder, the interior surface of which is preferably provided with parallel circular grooves *a a*. (See Figs. 6 and 7.) Within the cylinder is located a bushing or tube of gum, rubber, or other elastic material. The grooves *a a* serve to hold this tube firmly in place within the cylinder. One end of the bushing D is rabbeted at d, and this rabbet receives the flange e, formed at one end of the cylinder, and thus makes a neat and tight joint at that point. The section C is provided near the flanged end thereof with an external circumferential flange c, extending partially around this semi-cylindrical part, said flange c being inclined with relation to the periphery of the end of the cylinder, so that it may not be parallel to said periphery. The outer edge of the flange c, however, is curved concentric with the semi-cylinder. (See Fig. 4, where this is clearly indicated.) The semi-cylindrical section B is provided near its flanged end with an extension or shank $b'$, carrying a flange b, whose edge $b^2$ is curved concentric with the semi-circular end of the section B, said flange being slightly inclined with relation to the plane of the periphery of the end of the section B, the inclination of the flange b being, however, the reverse of the inclination of the flange c. The section of the pipe A will be inserted tightly into the cylinder composed of the sections B and C just described. The manner of this insertion is best indicated in Fig. 2. When desired, a right-angled pipe A' may be inserted within the pipe A, for the purpose of making a neat angle in said pipe A and for strengthening said angle and maintaining its form.

From the foregoing description of the construction of the couplings it will be easily seen how said duplicate couplings may be connected for the purpose of joining together two sections of pipe. Let the two duplicate couplings be placed in the position shown in Fig. 9. Then if the coupling shown in the right hand of said figure be moved horizontally toward the other the flange c of the right-hand part will pass beneath the flange b of the left-hand part, and the flange c of the left-hand part will pass beneath the flange b of the right-hand part. Now if the two duplicate parts be slightly rotated in opposite directions these flanges, which, as we have seen, are slightly inclined in the manner specified, will as the result of this slight relative rotation be brought into close engagement, and the duplicate sections will thus be drawn together, their ends pressing tightly upon each other, and the internal bushings D will have their ends brought into contact, so that the two sections A A will be connected as firmly and securely as if they constituted one continuous line of tubing. (See Fig. 2, where this intimate connection of the several parts is fully illustrated.)

My improved hose-coupling is exceedingly easy of adjustment in the engagement or disengagement of its duplicate parts. In Fig. 1 the duplicate parts are shown in the position that they occupy after having been connected in the manner just described by reference to Fig. 9. If, now, it be desirable to disconnect these duplicate parts, all that need be done is to slightly rotate them in the reverse position from that in which they were previously rotated to engage them, and this rotation will result in effectual disengagement. Suppose a train the air-pipes of whose pneumatic-brake system are connected by my improved hose-couplings should break apart, these duplicate sections of the pipe-coupling will be automatically separated, for the longitudinal strain upon the two sections of pipe A A will be sufficient to uncouple the hose-coupling.

Having thus described my invention, what I claim as new, and desire to secure by Letters Patent, is—

1. The herein-described hose-coupling, consisting of the cylinder composed of two sections B and C, said section B having the flange b, carried on the shank $b'$, said flange having an edge $b^2$ concentric with the section, and said section C having an external flange c, the flanges b and c being reversely inclined with relation to each other, and the internal gum bushing or tube, all substantially as described.

2. In a hose-coupling, the combination of the cylinder composed of sections B and C, said section B having a flange b, carried on a shank $b'$ and with its edge $b^2$ concentric with the cylinder, and said section C having a flange c, said flanges b and c being reversely inclined with relation to each other, and the gum or rubber tube D, located within the cylinder and having a rabbet d to receive the flange e on the end of the cylinder, all substantially as described.

In testimony whereof I affix my signature in presence of two witnesses.

NATHANIEL J. PRITCHARD.

Witnesses:
J. O. HARRIS,
WALTER BUDWELL.